United States Patent
Tsuruta et al.

(10) Patent No.: US 11,248,592 B1
(45) Date of Patent: Feb. 15, 2022

(54) SHAPE MEMORY ALLOY ENHANCED BI-STABLE ACTUATOR

(71) Applicant: Toyota Motor Engineering & Manufacturing North America, Inc., Plano, TX (US)

(72) Inventors: Ryohei Tsuruta, Ann Arbor, MI (US); Brian J. Pinkelman, Ann Arbor, MI (US); Umesh Gandhi, Farmington Hills, MI (US); Paul A. Gilmore, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/214,115

(22) Filed: Mar. 26, 2021

(51) Int. Cl.
*F03G 7/06* (2006.01)

(52) U.S. Cl.
CPC ................... *F03G 7/065* (2013.01)

(58) Field of Classification Search
CPC ...................................... F03G 7/065
USPC ...................................... 60/526–528
See application file for complete search history.

(56) References Cited

U.S. PATENT DOCUMENTS

| | | | |
|---|---|---|---|
| 4,553,393 A * | 11/1985 | Ruoff | F16F 3/04 337/140 |
| 7,971,296 B2 | 7/2011 | Jansen | |
| 8,100,471 B2 * | 1/2012 | Lawall | B60N 2/42763 297/216.1 |
| 2017/0252260 A1 | 9/2017 | Gummin et al. | |

FOREIGN PATENT DOCUMENTS

CN 107485536 B 1/2020

* cited by examiner

*Primary Examiner* — Shafiq Mian
(74) *Attorney, Agent, or Firm* — Dinsmore & Shohl LLP

(57) ABSTRACT

A shape memory alloy actuator includes a bistable shape memory alloy strip having openings. The bistable shape memory alloy strip having a straight stable state and a curled stable state. The shape memory alloy actuator further includes a shape memory alloy wire located along a side of the bistable shape memory alloy strip. The shape memory alloy wire contracts from heat exposure with each end secured to one of the plurality of openings of the bistable shape memory alloy strip.

11 Claims, 2 Drawing Sheets

SHAPE MEMORY ALLOY ENHANCED BI-STABLE ACTUATOR

TECHNICAL FIELD

The present specification generally relates to shape memory alloys and, in particular, to shape memory alloys that actuate in beneficial ways.

BACKGROUND

Individuals who are in bed for extended periods of time can develop bed sores. Having another person manually move the position of a bedridden person may be cumbersome or such help may not be available. Adjustable beds may be manually operated, which may still require regular assistance, and/or electric power, which can increase cost, weight, complexity, and dependence upon a power source.

Accordingly, there exists a need for improved ways to prevent bed sores for those who are bedridden.

SUMMARY

In an embodiment, a shape memory alloy actuator includes a bistable shape memory alloy strip having openings. The bistable shape memory alloy strip has a straight stable state and a curled stable state. The shape memory alloy actuator further includes a shape memory alloy wire located along a side of the bistable shape memory alloy strip. The shape memory alloy wire contracts from heat exposure with each end secured to one of the plurality of openings of the bistable shape memory alloy strip.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
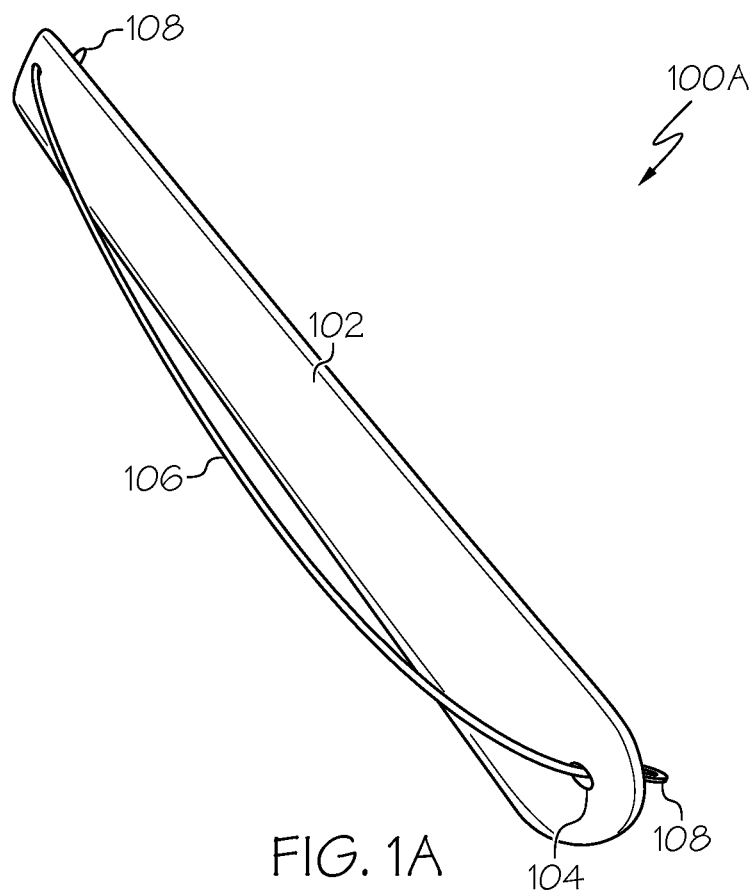
FIG. 1A schematically depicts a perspective view of a shape memory alloy wire attached to a straight bistable shape memory alloy strip, according to one or more embodiments shown and described herein.

Embodiments described herein are directed to shape memory alloy actuators that include a bistable shape memory alloy strip having openings at its ends and two natural states: a straight stable state and a curled stable state. The shape memory alloy actuators described herein include one or more shape memory alloy wires that may be secured through the bistable shape memory alloy strip openings. A shape memory alloy wire may contract when exposed to heat and return to its original length once the heat is removed and the shape memory alloy wire has cooled off. In particular, by causing contraction of the shape memory alloy wire, heat exposure may lead to curling of some or all of the bistable shape memory alloy strip. Thus, the contraction of the shape memory alloy wire and curling of the shape memory alloy actuator may be accomplished by convenient heat sources such as body heat, hot air, or a heating element, such as a thermoelectric device. Thus, the efficient use convenient heat sources can make the support provided from shape memory alloy actuators more convenient, energy efficient, lighter weight, and reactive to body heat than conventional electrical/mechanical support devices or actuators. Various embodiments of the shape memory alloy actuator and the operation of which, are described in more detail herein. Whenever possible, the same reference numerals will be used throughout the drawings to refer to the same or like parts.

Figure 1B:
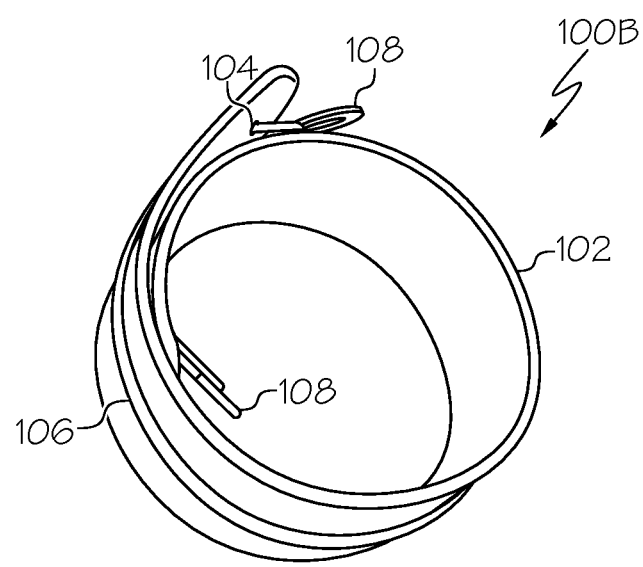
FIG. 1B schematically depicts a perspective schematic view of the shape memory alloy wire attached to the bistable shape memory alloy strip of FIG. 1A in a curled state, according to one or more embodiments shown and described herein.

Referring now to FIGS. 1A-1B, a shape memory alloy actuator 100A-100B is schematically depicted as having bistable shape memory alloy strip 102 with a shape memory alloy wire 106 having shape memory alloy wire ends 108 secured via openings 104 located near the ends of the bistable shape memory alloy strip 102. In this embodiment, the bistable shape memory alloy strip 102 is depicted in a straight state, as one of its stable positions. This may mean, for example, that the bistable shape memory alloy strip 102 would resist force trying to change its shape, such as a bending force, up to a threshold amount of force. Any suitable number of openings 104 in the bistable shape memory alloy strip 102 may be present in any suitable configuration. Although depicted as being located near the ends of the bistable shape memory alloy strip 102, the opening 104 may be located in any other suitable locations on the bistable shape memory alloy strip 102. The shape memory alloy wire ends 108 may comprise any type of attached object, loop, splice, or any other configuration to prevent the shape memory alloy wire ends 108 from slipping or falling out of the respective openings 104. In some embodiments, the shape memory alloy wire ends 108 may be affixed to one or both sides of the bistable shape memory alloy strip 102 by fastener(s) (clamps, bolts, screws, nails, or any other suitable type of fastener), adhesives, welding, and the like.

In the embodiment depicted in FIG. 1A, the shape memory alloy wire 106 is straight. In this embodiment, the shape memory alloy wire 106 is not being subjected to a temperature above a threshold (i.e., not heated), and thus maintains its full length without contraction. The shape memory alloy wire 106 may comprise any suitable material(s), such as by way of non-limiting examples recited here in Table 1:

TABLE 1

| | |
|---|---|
| Ag—Cd 44/49 at. % Cd | Au—Cd 46.5/50 at. % Cd |
| Co—Ni—Al | Co—Ni—Ga |
| Cu—Al—Be—X(X:Zr, B, Cr, Gd) | Cu—Al—Ni 14/14.5 wt. % Al, 3/4.5 wt. % Ni |
| Cu—Al—Ni—Hf | Cu—Sn approx. 15 at. % Sn |
| Cu—Zn 38.5/41.5 wt. % Zn | Cu—Zn—X (X = Si, Al, Sn) |

TABLE 1-continued

| | |
|---|---|
| Fe—Mn—Si | Fe—Pt approx. 25 at. % Pt |
| Mn—Cu 5/35 at. % Cu | Ni—Fe—Ga |
| Ni—Ti approx. 55-60 wt. % Ni | Ni—Ti—Hf |
| Ni—Ti—Pd | Ni—Mn—Ga |
| Ti—Nb | |

| | |
|---|---|
| Ag = Silver | Hf = Hafnium |
| Cd = Cadmium | Zn = Zinc |
| Co = Cobalt | Au = Gold |
| Ni = Nickel | Fe = Iron |
| Al = Aluminum | Mn = Manganese |
| Cu = Copper | Si = Silicon |
| Be = Beryllium | Ti = Titanium |
| Zr = Zirconium | Nb = Niobium |
| B = Boron | Ga = Gallium |
| Cr = Chromium | Pt = Platinum |
| Gd = Gadolinium | |

The shape memory alloy wire 106 may comprise any of the materials or combinations of materials listed in Table 1 and/or any other suitable material(s), by way of non-limiting example. Additionally, by way of non-limiting example, the bistable shape memory alloy strip 102 may comprise any of the materials or combination of materials listed in table 1 and/or any other suitable material(s).

Turning to FIG. 1B, once an amount of force exceeding a threshold is received, the bistable shape memory alloy strip 102 depicted in FIG. 1A may transform into its other stable position (i.e., curled). The curled state depicted in FIG. 1B may be obtained, for example, by contraction of the shape memory alloy wire 106. Heat may be utilized to contract the shape memory alloy wire 106, in which sources of heat may include hot air, body heat, and/or thermoelectric devices, by way of non-limiting examples. Contraction of the shape memory alloy wire 106 in this embodiment may be in a range of 4-8% percent smaller total length when contracted as compared to when straight, although the percent contraction may vary in other embodiments. The force involved in the contraction in this embodiment may be in the range of 275-400 MPa (megapascal), a unit of force per unit area in terms of pressure, stress, Young's modulus, and ultimate tensile strength. The contraction force values/ranges may vary in other embodiments.

Once heat is removed, contraction of the shape memory alloy wire 106 may reverse from a curled state and straighten, such that the bistable shape memory alloy strip 102 may return to the straight position depicted in FIG. 1A. In this embodiment, contraction and/or lengthening of the shape memory alloy wire 106 may be localized to one or more portions of the shape memory alloy wire 106. For example, if heat is applied to one end of the shape memory alloy wire 106, this may cause a localized contraction to that end portion of the shape memory alloy wire 106 without the unheated remaining portion contracting. This in turn may lead to a curling of the corresponding end of the bistable shape memory alloy strip 102 where heat is being applied, without curling of the remainder of the bistable shape memory alloy strip 102. Similarly, lengthening of the shape memory alloy wire 106 and corresponding straightening of the bistable shape memory alloy strip 102 may be localized to a portion where heat is no longer being applied, even if heat is still being applied to other portions (or the remainder) of the shape memory alloy wire 106. Additionally, although one shape memory alloy wire 106 is depicted, any suitable number of shape memory alloy wires 106 may be utilized. This may increase the amount or strength of curling that can be achieved, such as under a heavy load, where more shape memory alloy wires 106 can curl the shape memory alloy actuator under a heavier weight/load.

Figure 2:
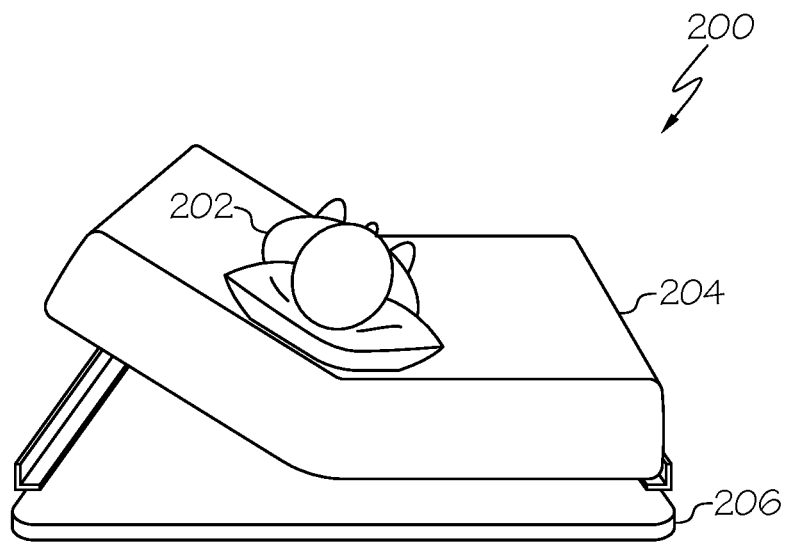
FIG. 2 schematically depicts a side view of a person being elevated in a bed utilizing a shape memory alloy actuator, according to one or more embodiments shown and described herein.

Turning to FIG. 2, a side view of a person 202 being elevated by a bed 204 supported by a base 206 utilizing a shape memory alloy actuator is shown. Here, one or more shape memory alloy actuators may be utilized to span across the bed 204, such that body heat from the person 202 may result in a partial-curling of the shape memory alloy actuator(s). In another embodiment, one or more thermoelectric devices may provide heat to cause curling of the shape memory alloy actuator(s), used alone or in conjunction with body heat from the person 202. In this way, the lifting of an end of the bed 204 due to body heat from the user can keep the person from 202 developing bed sores due to being stationary in the same position for a prolonged period of time. Merely having the person move (or be moved) to another portion of the bed can modify the curvature of the bed as the change in the location of the body heat causes a different portion of the shape memory alloy actuator to curl. In some embodiments, the curling of the bed 204 itself may move the person 202 to prevent bedsores.

Figure 3:
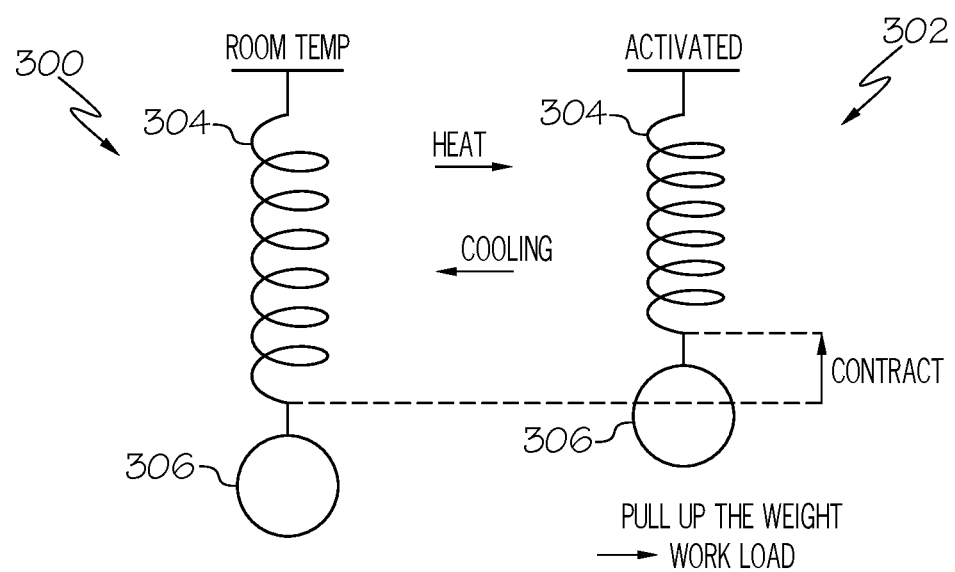
FIG. 3 schematically depicts a side view of a shape memory alloy wire in contracted coil and uncontracted coil forms, according to one or more embodiments shown and described herein.

Turning to FIG. 3, a side view of a shape memory alloy wire in a contracted, heated form 302 and an uncontracted, unheated form 300 is shown. In this embodiment, a weight 306 may hang lower when supported by the shape memory alloy coil 304 in the unheated form 300 at room temperature (or cooler). By contrast, the same weight 306 may hang higher when supported by the shape memory alloy coil 304 in the contracted, heated form 302. Thus, instead of a wire, a shape memory alloy coil 304 may be utilized to accomplish curling of a shape memory alloy actuator.

It should now be understood that embodiments described herein are directed to shape memory alloy actuators that include a bistable shape memory alloy strip with a shape memory alloy wire whose ends may be disposed in openings located at the ends of the bistable shape memory alloy strip. Application of heat to the shape memory alloy wire can cause its contraction, and thus result in curling of at least a portion of the shape memory alloy actuator into the heat is removed. The shape memory alloy actuators may provide actuation based upon the location of the application of heat. For example, in the context of a bed embodiment, this localized heat may cause a portion of the bed or mattress to curl in a manner that the weight of the patient is shifted or massaged, which can help reduce bed sores. This type of heat-reactive support activation, such as in the context of body heat, may provide intuitive and long-lasting support in any suitable environment, such as a bed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A shape memory alloy actuator comprising:
a bistable shape memory alloy strip comprising a plurality of openings, the bistable shape memory alloy strip being configured to have a straight stable state and a curled stable state; and
a shape memory alloy wire located along a side of the bistable shape memory alloy strip, the shape memory alloy wire being configured to:
contract from heat exposure; and
have each end secured to one of the plurality of openings of the bistable shape memory alloy strip.

2. The shape memory alloy actuator of claim 1, further configured to:
transform from a straight state to a coiled state due to heat exposure; and
transform from the coiled state to the straight state due to a lack of heat exposure.

3. The shape memory alloy actuator of claim 1, wherein ends of the shape memory alloy wire are secured to the plurality of openings of the bistable shape memory alloy strip via clamps, bolts, adhesive, welding, screws, or nails.

4. The shape memory alloy actuator of claim 1, wherein the bistable shape memory alloy strip comprises nickel titanium alloy in a range of 40-60%.

5. The shape memory alloy actuator of claim 1, wherein the shape memory alloy wire contracts from heat exposure in a range of 4-8%.

6. The shape memory alloy actuator of claim 1, wherein heat is provided by body heat, warm air, or a heating element.

7. The shape memory alloy actuator of claim 1, wherein the shape memory alloy wire comprises (i) silver-cadmium, (ii) gold-cadmium, (iii) cobalt-nickel-aluminum, (iv) cobalt-nickel-gallium, (v) copper-aluminum-beryllium and at least one of zirconium, boron, chromium, or gadolinium, (vi) copper-aluminum-nickel, (vii) copper-aluminum-nickel-hafnium, (viii) copper-tin, (ix) copper-zinc, (x) copper-zinc and at least one of silicon, aluminum, or tin, (xi) iron-manganese-silicon, (xii) iron-platinum, (xiii) manganese-copper, (xiv) nickel-iron-gallium (xv) nickel-titanium, (xvi) nickel-titanium-hafnium, (xvii) nickel-titanium-palladium, (xviii) nickel-manganese-gallium, (xix) titanium-niobium, or any combination thereof.

8. The shape memory alloy actuator of claim 1, further comprising a heating element wherein the bistable shape memory alloy strip is located between the heating element and the shape memory alloy wire.

9. The shape memory alloy actuator of claim 1, wherein the shape memory alloy wire is a coil configured to contract upon from heat exposure.

10. The shape memory alloy actuator of claim 1 further comprising a plurality of shape memory alloy wires.

11. A bed comprising the shape memory alloy actuator of claim 1, wherein the shape memory alloy actuator is configured to raise a portion of the bed based upon contact with body heat from a person lying in the bed.

* * * * *